US009773135B2

(12) United States Patent
Murphy (10) Patent No.: US 9,773,135 B2
(45) Date of Patent: Sep. 26, 2017

(54) PORTABLE DATA COLLECTION SYSTEM AND METHOD (71) Applicant: Jonathan David Murphy, Friday Harbor, WA (US)

(72) Inventor: Jonathan David Murphy, Friday Harbor, WA (US)

(73) Assignee: AKTIEBOlAGET SKF, Gothenburg (SE)

(*) Notice: Subject to any disclaimer, the term of this patent is extended or adjusted under 35 U.S.C. 154(b) by 0 days.

(21) Appl. No.: 14/652,265

(22) PCT Filed: Dec. 16, 2013

(86) PCT No.: PCT/US2013/075283
§ 371 (c)(1),
(2) Date: Jun. 15, 2015

(87) PCT Pub. No.: WO2014/093963
PCT Pub. Date: Jun. 19, 2014

(65) Prior Publication Data
US 2015/0332073 A1 Nov. 19, 2015

(51) Int. Cl.
H04Q 5/22 (2006.01)
G06K 7/10 (2006.01)
G05B 19/418 (2006.01)

(52) U.S. Cl.
CPC ..... *G06K 7/10366* (2013.01); *G05B 19/4183* (2013.01); *G05B 2219/33192* (2013.01); *G05B 2219/49302* (2013.01); *Y02P 90/10* (2015.11)

(58) Field of Classification Search
CPC combination set(s) only.
See application file for complete search history.

(56) References Cited

U.S. PATENT DOCUMENTS

2005/0070811 A1* 3/2005 Crowley ............... G01K 1/024
600/549
2005/0275528 A1* 12/2005 Kates ..................... G08B 1/08
340/539.22

(Continued)

FOREIGN PATENT DOCUMENTS

WO 2008103225 A1 8/2008

*Primary Examiner* — Brian Zimmerman
*Assistant Examiner* — Cal Eustaquio
(74) *Attorney, Agent, or Firm* — Bryan Peckjian; SKF USA Inc. Patent Dept.

(57) ABSTRACT

Systems and methods for collecting and/or managing data are provided. The system includes a plurality of radio frequency identification (RFID) tags attached to a plurality of machines. Each of the plurality of RFID tags includes a tag ID. The system also includes a mobile data collector configured to take a measurement of one or more operating conditions of the plurality of machines and to read the tag ID from a proximal one of the plurality of RFID tags. The system also includes a computing device including a processor and a memory storing a database, the database associating the tag ID of each of the plurality of RFID tags with the one of the plurality of machines to which it is attached. Further, the computing device is configured to receive the measurement and the tag ID from the mobile data collector and analyze the one or more operating conditions.

19 Claims, 4 Drawing Sheets (56) References Cited

U.S. PATENT DOCUMENTS

| | | | | |
|---|---|---|---|---|
| 2007/0229229 A1* | 10/2007 | Nelson | ................... | G01D 21/00 |
| | | | | 340/10.41 |
| 2008/0074253 A1* | 3/2008 | Jeffery | ..................... | G07C 3/00 |
| | | | | 340/539.11 |
| 2008/0201388 A1* | 8/2008 | Wood | ..................... | G06Q 10/06 |
| 2011/0279245 A1* | 11/2011 | Hynes | ................... | G06K 17/00 |
| | | | | 340/10.42 |

* cited by examiner

PORTABLE DATA COLLECTION SYSTEM AND METHOD

CROSS-REFERENCE

This application is the U.S. national stage of International Application No. PCT/US13/75283 filed on Dec. 16, 2013, which claims priority to U.S. Provisional Patent Application No. 61/737,290, filed on Dec. 14, 2012.

TECHNICAL FIELD

The present disclosure relates to management of data collection, e.g., of operating conditions of a machine.

BACKGROUND

Data is often collected to monitor the operation of industrial machines. Such data collection may be used to diagnose problems, troubleshoot, trend operating changes, or otherwise record data points indicative of machine operation. A variety of data types may be collected, including temperature, vibration, and the like. The data collection may be continuous, i.e., using dedicated resources for individual machines or groups of machines. In other cases, data collection may be on-demand, for example, in routine checking and maintenance of the machines. In the latter case, mobile units may be provided that use sensors that are either permanently or temporarily coupled with the machine being measured.

Such on-demand data collection may, however, be costly in terms of time and resources. For example, if several machines are being checked using a mobile unit, complexity in the operation of the data collection unit may be multiplied and may require significant time allocation. Further, bulkiness of such units may hinder movement between machines being measured. However, a reduction in unit size may reduce functionality, such as the ability to retain measurements from previous operations, execute data collection/management software, etc. Complexity may also introduce the possibility of human error, and thus resources may be expended in training users to operate the units.

Furthermore, with mobile units, since they may capture data about several different machines in a session, care must be taken to establish the correct operating conditions to be monitored, associated with the correct machine, and with the correct operating constraints applied thereto, etc. Typically, this requires significant investments in training personnel responsible for collecting the data using the mobile units, and in software to manage the collected data and minimize error.

SUMMARY

Embodiments of the disclosure may provide a method for managing data. The method may include associating, using a processor, a plurality of machines with a plurality of tag IDs. Each of the tag IDs is associated with a radio frequency identification (RFID) tag, with a first one of the plurality of machines being associated with a first tag ID of the plurality of tag IDs. The method may also include receiving, from a user, operating data indicative of an operating condition of the first one of the plurality of machines and identification data associated with the first tag ID. The method may also include analyzing the operating data of the first one of the plurality of machines to generate a result, and transmitting the result to the user.

Embodiments of the disclosure may also provide a method of managing data. The method may include causing machine data of a machine and a location for an RFID tag on the machine to be stored in a database in association with a tag ID of the RFID tag. The method may also include attaching the RFID tag on or near to the machine at or in proximity to the location, and positioning a mobile data collector at or proximal to the location while the machine is operating. The method may also include reading the tag ID using the mobile data collector, and collecting operating data while the machine is operating using the mobile data collector. The method may further include transmitting the operating data in association with the tag ID from the mobile data collector to a host computing device. The host computing device is configured to analyze the operating data and produce a result therefrom.

Embodiments of the disclosure may further provide a system for managing data. The system may include a plurality of radio frequency identification (RFID) tags attached to a plurality of machines, with each of the plurality of RFID tags storing a tag ID. The system may also include a mobile data collector configured to take a measurement of one or more operating conditions of the plurality of machines and to read the tag ID from a proximal one of the plurality of RFID tags. The system may additionally include a computing device including a processor and a memory storing a database, with the database associating the tag ID of each of the plurality of RFID tags with the one of the plurality of machines to which it is attached. The computing device is configured to receive the measurement and the tag ID from the mobile data collector and analyze the one or more operating conditions.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

It should be noted that some details of the figures have been simplified and are drawn to facilitate understanding of the embodiments rather than to maintain strict structural accuracy, detail, and scale.

DETAILED DESCRIPTION

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
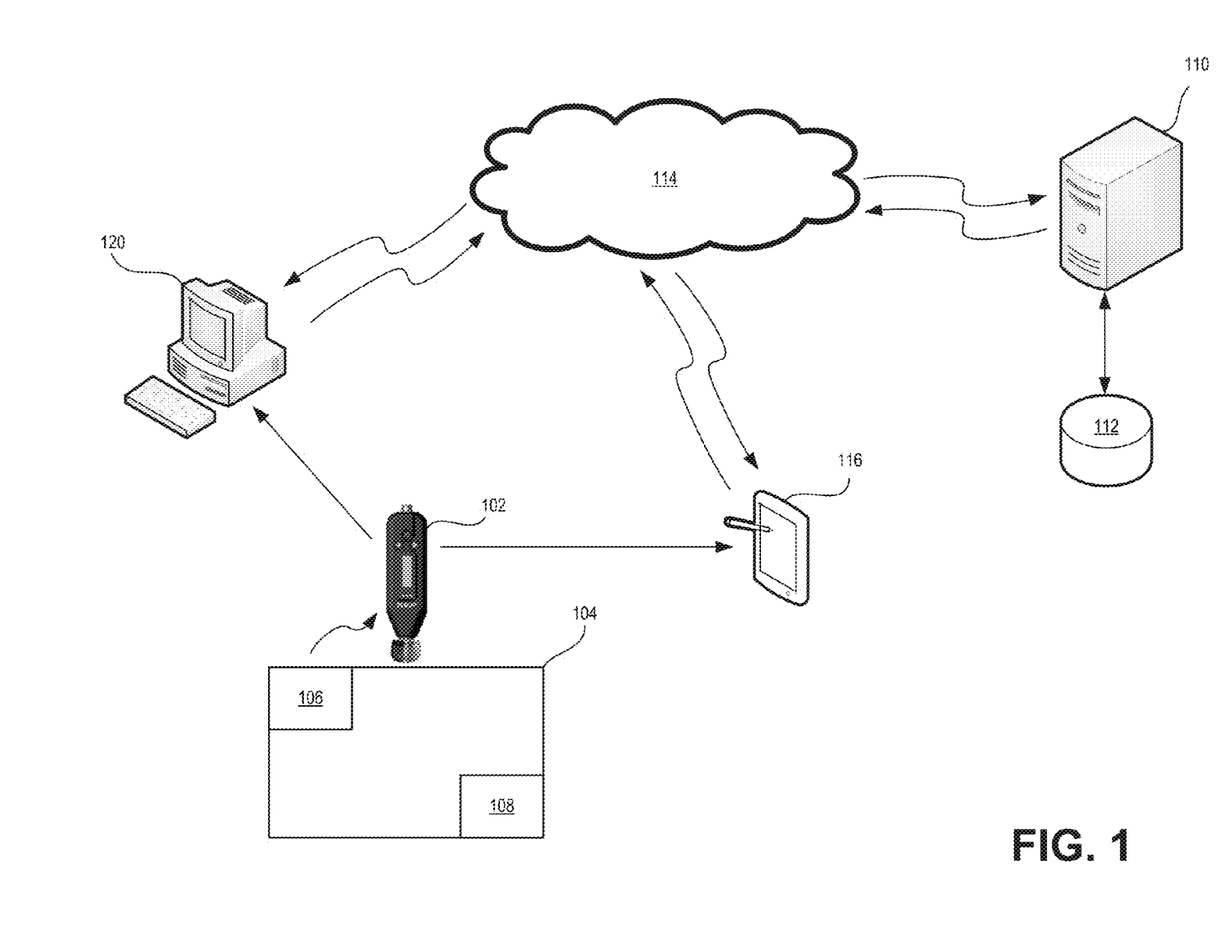
FIG. 1 illustrates a schematic view of a data management system employing a mobile data collector, according to an embodiment.

FIG. 1 illustrates a schematic view of a system 100 for collecting and/or managing data, according to an embodiment. The system 100 may include a mobile data collector 102 configured to collect data related to a machine 104. The mobile data collector 102 may include one or more sensors, probes, or the like. For example, the mobile data collector 102 may include a temperature sensor such as a thermistor, thermocouple, infrared sensor, or the like, a velocity sensor, an accelerometer, a vibration sensor, a potentiometer, an ammeter, an ohmmeter, a magnetic field sensor, and/or any other suitable type of sensor configured to collect any type of data characterizing operation of the machine 104. In some embodiments, the mobile data collector 102 may be configured to measure multiple types of operating conditions (e.g., temperature and vibration) simultaneously, sequentially, selectively, or a combination thereof.

The machine 104, as illustrated, may represent any number of machines with which the system 100 may be employed or may include. The machines 104 may be rotary machines, such as compressors, pumps, turbines, gensets, engines, motors, or the like. In other embodiments, the machines 104 may be any other type of machine. Further, the machines 104 may be organized as a "route," i.e., a planned or preselected sequence or progression of machines 104 to be measured using the mobile data collector 102 (e.g., as part of a session).

The mobile data collector 102 may also include a tag reader configured to read a tag identifier (ID) from one or more radio frequency identification (RFID) tags (two are shown: 106, 108). In an example, the mobile data collector 102 may include an inductor configured to energize passive RFID tags 106, 108, when the mobile data collector 102 is brought into proximity therewith, and thereby read data such as the tag ID from the RFID tags 106, 108. In other embodiments, the RFID tags 106, 108 may be active RFID tags, which may transmit data to the mobile data collector 102 without requiring the mobile data collector 102 to provide the energizing.

In an embodiment, the RFID tags 106, 108 may be coupled with a single machine 104. In various cases, one, three, or more RFID tags 106, 108 may be coupled with a single machine 104. Further, each of the RFID tags 106, 108 may be associated with a location of (e.g., on, within, etc.) the machine 104. The location may be at or near a point where measurements are to be collected, such as a shaft, bearing housing, and/or other components for which monitoring the operating conditions is useful. As noted above, in some cases, multiple RFID tags 106, 108 may be associated with the same machine 104, while multiple RFID tags 106, 108 may be associated with the same location on different machines; however, in at least one embodiment, the combination of machine 104 identity and location thereof may be unique for each RFID tag 106, 108.

The mobile data collector 102 is depicted as being proximal to the RFID tag 106 for purposes of illustration. As the terms are used herein, "proximal," "in proximity to," and grammatical equivalents, are defined to mean "within an effective range," which may vary according to the devices of the system 100 being discussed and/or the types of devices in various embodiments. For example, the RFID tags 106, 108 may be near field communication (NFC) tags, which may have an effective range of one meter or less, or may be another type of RFID tag 106, 108 having a longer range.

When the mobile collector device 102 is brought into proximity with the location of the RFID tag 106, as shown, the mobile data collector 102 may be configured to read the tag ID from the RFID tag 106. The mobile collector device 102 may then store the tag ID of the RFID tag 106 and take one or more measurements of the operating conditions of the machine 104 in association with the tag ID read. In at least one embodiment, the mobile data collector 102, when activated (e.g., in response to actuating an activation switch or button), may be configured to automatically determine when it is in proximity to the RFID tag 106. The mobile data collector 102 may display a successful reading of the tag ID from the RFID tag 106, and may automatically commence taking one or more measurements of operating conditions. Moreover, in at least one specific embodiment, the mobile data collector 102 may be configured to detect when the condition being measured has reached a steady state in the mobile data collector 102, and may take one, some, or all of the measurements at steady state.

The mobile data collector 102 may also include one or more processors, a display, and memory, for example, to store an internal database of information. The processor may be any suitable type of processor and may be configured to communicate with the probe or sensor and the tag reader, so as to at least receive information therefrom. The processor may also be coupled with a display. Accordingly, the processor may determine a status of operation of the mobile data collector 102 and/or receive and interpret data collected using the probe/sensor and/or the tag reader, and show the data on the display so the user may read the data, e.g., in real time. The display may be any suitable type of display, such as a liquid crystal display (LCD), touchscreen, or the like.

In at least one embodiment, the mobile data collector 102 may also include an image capture device (camera), audio capture device (microphone), or the like, as well as memory sufficient to record such non-text data. The mobile data collector 102 may be configured to extract information (e.g., tag ID, machine identifying information, location information, etc.) from the non-text data. Additionally or alternatively, the mobile data collector 102 may be configured to transmit the non-text data to another device, such that the extraction may be conducted by the other device.

The system 100 may also include a host computing device 110, which may be disposed at the same or a different facility or area as the mobile data collector 102. The illustrated host computing device 110 may be representative of one or several (e.g., an array of) computing devices, which may be accessed by one or several different entities. Further, the host computing device 110 may include a memory, as will be described in greater detail below, which may store thereon a database 112. The database 112 may associate tag IDs of each of the RFID tags 106, 108 with information about the machines 104 on or near to which they are attached. For example, the database 112 may associate the tag IDs with an identity (e.g., serial number, location, facility, name, etc.) of the machine 104 with the tag IDs of the RFID tags 106, 108. Further, the database 112 may associate the particular location of the RFID tags 106, 108 on the machine 104 with the tag IDs. Additionally, the database 112 may associate the tag ID of each of the RFID tags 106, 108 with acceptable operating conditions for the machine 104 to which the RFID tags 106, 108 are attached. Such acceptable operating conditions may be referred to as an "operating envelope," which may or may not include manufacturer data, factors of safety, other safety requirements or standards, design conditions, operating environment, and/or the like.

The system 100 may provide for the data (e.g., tag ID and measurements of operating conditions) captured by the mobile data collector 102 to be transmitted to the host computing device 110. In some case, the mobile collector device 102 may include a radio and/or other hardware and may packetize the measurement with the tag ID and transmit the data to the host computing device 110, for example, via a network 114. In various examples, the network 114 may be a local area network, or wide area network such as the internet, and may be or include wireless connections, wired transmission lines, or both, as well as switches, routers, servers, etc.

In other embodiments, the mobile data collector 102 may provide the measurements to a mobile computing device 116. The mobile computing device 116 may also be mobile (e.g., portable), allowing it to be conveniently moved along with the mobile data collector 102. In some embodiments, the mobile computing device 116 may be or include one or more notebook or laptop computers, tablet devices, smartphones, etc. The mobile computing device 116 may communicate with the mobile data collector 102 via a wired connection such as a universal serial bus (USB) connection, Ethernet connection, or the like. Additionally or alternatively, the mobile computing device 116 may communicate with the mobile data collector 102 via a wireless connection, such as a BLUETOOTH® or another wireless protocol. In turn, the mobile computing device 116 may transmit data received from the mobile data collector 102 to the host computing device 110 via the network 114. In some cases, the mobile computing device 116 may be considered to be part of the mobile data collector 102, whether contained in a single housing or being configured as separate units.

The host computing device 110 may analyze the data received from the mobile data collector 102 (e.g., by way of the mobile computing device 116). For example, the host computing device 110 may receive the tag ID and access an index of the database 112 associated with the tag ID. The host computing device 110 may then analyze the operation of the machine 104 based on the operating conditions. For example, the host computing device 110 may compare the measurement of the operating conditions with the operating envelope to determine whether the machine 104 is operating within design constraints. Additionally, the host computing device 110 may compute operating trends, diagnose system health, wear, remaining life, etc., based on the conditions and/or using the trends.

The system 100 may further provide for the display of the results of the analysis by the host computing device 110. In some cases, this may be provided by way of a graphical user interface. The graphical user interface may provide intuitive access for a user to view the trends, operating history, etc., as determined by the host computing device 110. In some cases, the graphical user interface may be accessible to a local computing device 120, such as a computer, workstation, or the like. Additionally or alternatively, the graphical user interface may be accessible to the mobile computing device 116. In some cases, different graphical user interfaces may be tailored for use for the mobile computing device 116 and the local computing device 120. The local computing device 120 and/or mobile computing device 116 may display the results of the analyses conducted by the host computing device 110, allow for interaction with the results, etc., without having to perform the analyses locally. Such an arrangement may be generally known as "cloud computing," and may combine the computing power and/or storage resources of the host computing device 110 with the convenience of the mobile computing device 116, for example.

Figure 2:
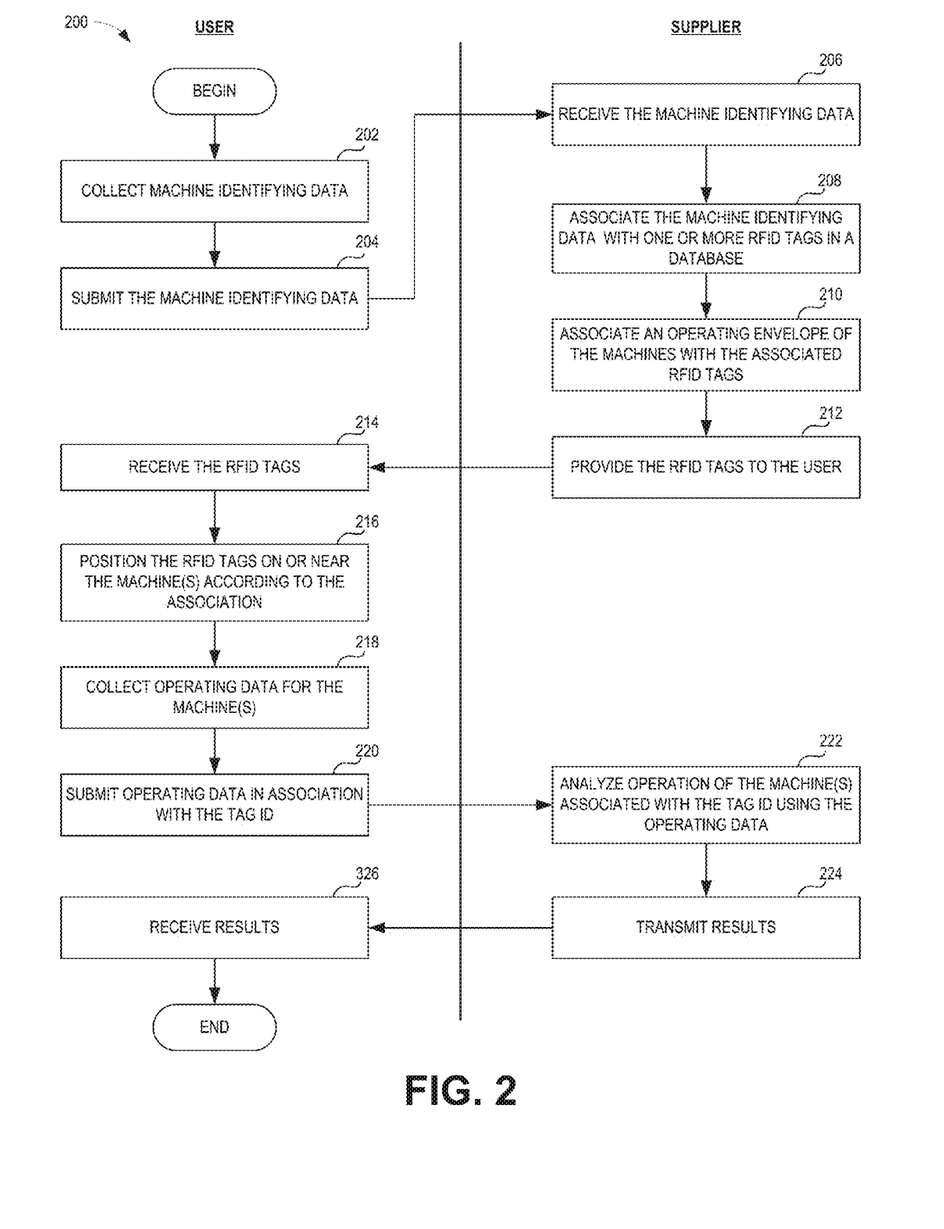
FIG. 2 illustrates a flowchart of a method for collecting and managing data, according to an embodiment.

FIG. 2 illustrates a flowchart of a method 200 for managing and/or collecting data, according to an embodiment. The method 200 may proceed by operation of one or more portions of the system 100 and thus is described reference thereto; however, it will be appreciated that the method 200 is not limited to any particular structure unless otherwise expressly stated herein.

The method 200 may include a user collecting identifying data for the machines 104, as at 202. The identifying data may include the type of machine (e.g., pump, compressor, motor, etc.), manufacturer, serial number, location in a factory, and/or any other relevant data. The identifying data may also indicate a location of the machine 104 where measurements are to be taken (e.g., by referencing a particular component of the machine 104, a side of the machine 104, etc.). Moreover, the identifying data may indicate a total number of machines 104 that are to be monitored and/or a total number of locations thereof. If a single location is selected for each machine 104, these two numbers may be the same; however, if the user requires two or more monitoring locations for any of the machines 104, the numbers may differ.

With the identifying data collected, the method 200 may proceed to the user submitting the identifying data, as at 204, to a supplier. Such submitting may proceed by the mobile data collector 102, the mobile computing device 116, and/or the local computing device 120 transmitting the information electronically to the supplier, e.g., to the host computing device 110 provided or controlled by the supplier, via the network 114. In various embodiments, such electronic transmission may employ electronic mail, a TCP/IP connection, FTP, short message system (SMS), or any other type of or protocol for transmission. In other embodiments, the identifying data may be transmitted via telephone, written communication, etc.

The supplier may receive the identifying data, as at 206, for example, using the host computing device 110. The supplier may then allocate RFID tags 106, 108 to the submission and associate the machines 104 with the tag IDs of the RFID tags 106, 108, e.g., using the database 112, as at 208. Moreover, the supplier may associate the locations of the machines 104 with the tag IDs. As noted above, the combination of machine identity and location thereon may be unique for each RFID tag 106, 108.

The supplier may then associate operating envelopes of the machines 104 with the corresponding tag ID, as at 210. In some cases, the operating envelopes may be provided by the user. In other cases, the supplier may determine the operating envelopes, for example, by reference to manufacturer guidelines, standards, etc. Further, the supplier may take into consideration operating environment, wear, age, maintenance schedules, etc. to determine the operating envelope. This information may be provided by the user, calculated by the supplier, or a combination thereof. Accordingly, the operating envelopes may be dynamic, and may change over the course of the lifecycle of the machines 104. In other cases, the operating envelopes may be static.

In at least one embodiment, with the database 112 associating the tag IDs of the RFID tags 106, 108 with the identifying information of the machines 104 and/or any other salient machine 104 information, the supplier may provide the RFID tags 106, 108 having the tag IDs to the user, as at 212. The tag IDs may be coded into the RFID tags, such that the RFID tags 106, 108 transmit the tag IDs to the tag reader provided by the mobile data collector 102 when in proximity thereto. In some cases, the RFID tags 106, 108 may also be programmed to provide additional information to the mobile data collector 102.

The user may then receive the RFID tags, as at 214. The RFID tags received at 214 may be labeled or otherwise indicated with the identity of the machine 104 and/or location thereon that is associated with the RFID tags 106, 108 in the database 112. Accordingly, the user may position the RFID tags 106, 108 on or near the indicated machines 104, e.g., at the specified location, according to the association, as at 216. This may complete system 100 setup, according to the embodiment of the method 200; however, in other embodiments, setup may include additional elements.

The user may then collect operating data for the machines 104, e.g., using at least the mobile data collector 102, as at 218. As noted above, the mobile data collector 102 may read the tag ID of the proximal RFID tag 106 and may take measurements of one or more operating conditions. The mobile data collector 102 may be configured to take a single measurement, e.g., when steady state is determined, or may take multiple measurements and may save, average, compress, etc., the measurement(s).

The user may submit the operating data, e.g., in association with the tag ID of the read, proximal RFID tag 106, back to the supplier, as at 220. For example, the mobile data collector 102 may submit the operating data (e.g., via the mobile computing device 116, the local computing device 120, etc.) to the host computing device 110 over the network 114. It will be appreciated that the supplier that provides the RFID tags 106, 108 at 212 may be the same or different from the supplier to which the operating data is submitted at 220; however, for illustrative purposes, they are referred to by the same name ("supplier") herein.

The supplier, having received the operating data, may find the appropriate index in the database 112, e.g., using the tag ID submitted in association with or as part of the operating data. The supplier may then analyze the operation of the machine 104 using the one or more measurements of the operating conditions, as at 222. For example, the supplier may determine whether the measurements indicate that that the machine 104 is operating within the prescribed operating envelope. If the measurements indicate that the machine 104 is outside of the operating envelope, corrective action (e.g., initiating an alarm) may be required, and may be a result of the analysis at 222. Additionally, the supplier (e.g., the host computing device 110) may perform any number of other analyses, such as trending, health monitoring, efficiency calculations, maintenance scheduling, etc. Any of these may be formed into results, e.g., numerically, graphically, etc. The supplier may then transmit the results, as at 224, back to the user. In turn, the user receives the results, as at 226, e.g., using graphical user interface displayed using the mobile computing device 116.

Figure 3:
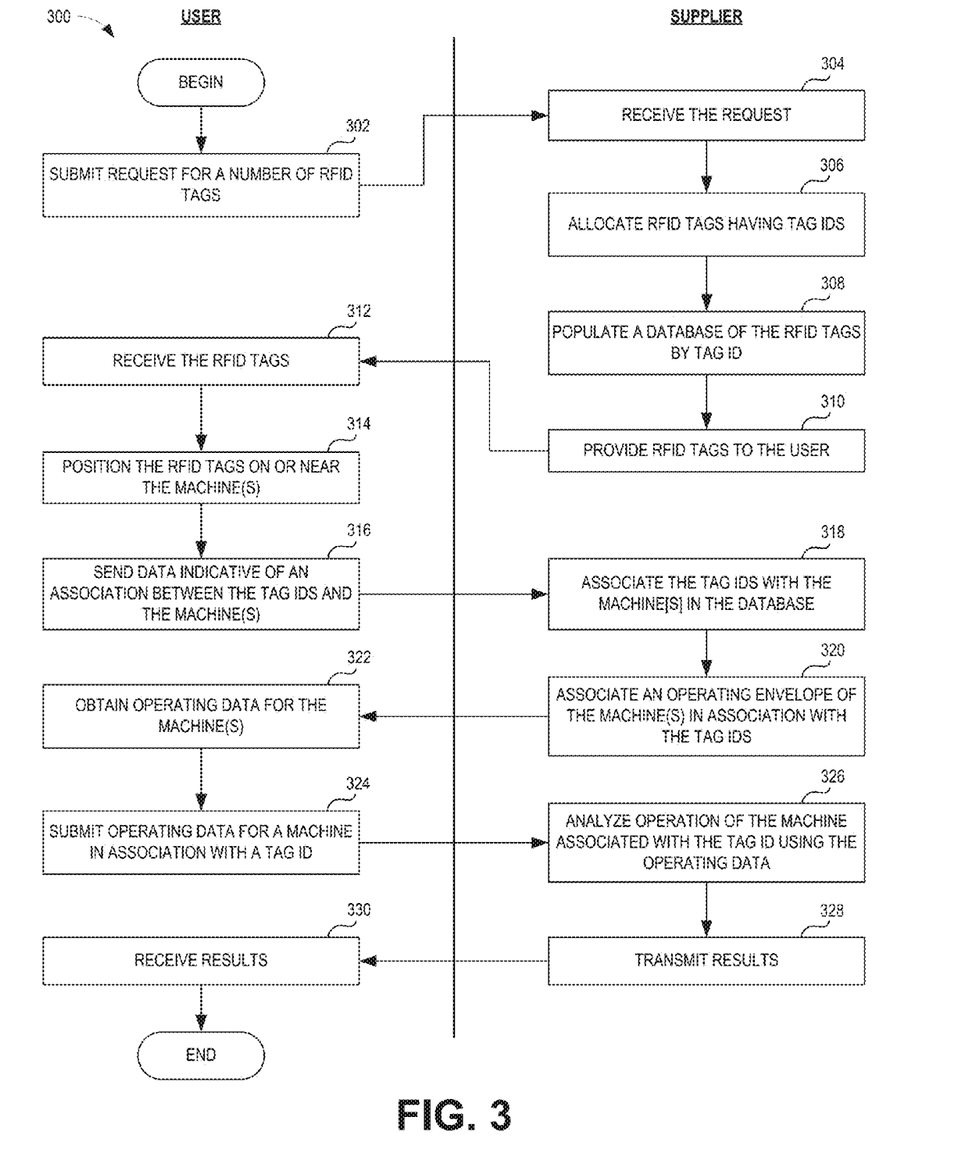
FIG. 3 illustrates a flowchart of another method for collecting and managing data, according to an embodiment.

In some cases, the user may not be prepared to submit all or even any of the machine identifying data prior to receiving the RFID tags 106, 108. Further, in some instances, the user may require more RFID tags than are presently necessary, such as when seeking to have spare RFID tags 106, 108 to account for failure, later incorporation of additional machines or spare parts, trial-and-error with locations to be monitored, etc. Accordingly, FIG. 3 illustrates a schematic view of a method 300 for managing data, e.g., using the system 100, in which the RFID tags 106, 108 may be provided to the user prior to the tag IDs thereof being associated with the machines 104 (and/or locations thereon) in the database 112.

It will be appreciated that aspects of the methods 200 and 300 may be combined, for example, such that some RFID tags 106, 108 are sent with their tag IDs associated with machines 104 and/or locations thereon while others are not. Thus, the methods 200, 300 are not to be considered mutually exclusive, but rather may be synergistic. Moreover, it will again be appreciated that the method 300 is not to be considered as limited to any particular structure, unless expressly stated.

The method 300 may begin by the user requesting a number of RFID tags 106, 108, as at 302. The number of RFID tags 106, 108 may be requested, for example, as part of a standardized lot or kit including a preselected number of tags, e.g., 30 tags. In other cases, the number of tags may be defined at the discretion of the user. The supplier may receive the request, as at 304, and allocate the number of RFID tags 106, 108, as at 306. The RFID tags 106, 108 may each be associated with a tag ID, and may be configured to transmit the tag ID to a tag reader, such as the tag reader included in the mobile data collector 102. The tag ID may thus be employed to populate the database 112, e.g., with indices for each of the tag IDs, as at 308. In some cases, the tag IDs may be printed on labels fixed to or otherwise visibly indicted on or proximal to the RFID tags 106, 108. In other embodiments, the RFID tags 106, 108 may not bear any visible indication of the tag ID. In either case and/or others, the RFID tags 106, 108 may be provided to the user, as at 310.

In turn, the user may receive the RFID tags 106, 108, as at 312. The user may then attach one or more of the RFID tags 106, 108 to a desired location on or near the machines 104, as at 314. For each of the RFID tags 106, 108 deployed, which are to be used in connection with the mobile data collector 102, the user may then transmit data indicative of an association between the tag IDs of the RFID tags 106, 108 and the machine 104, e.g., including a location on the machines 104 where the RFID tags 106, 108 are positioned.

Determining and sending the association of the tag IDs and machines 104 (and/or locations thereon) may be conducted in one or more of several ways. In one embodiment, blank labels may be sent to a user along with the RFID tags 106, 108 at 310. The user may then access a program to name machines/locations. The tag numbers of one of the RFID tags 106, 108 may then be logged and associated with the machine/location named on the label in the database 112, and the label affixed to the RFID tag (e.g., RFID tag 106). Subsequently, the RFID tag 106 may be attached to the location indicated on the label attached thereto.

In another embodiment, the RFID tags 106, 108 may be fixed to a desired machine 104 and/or location. The image capture device of the mobile data collector 102 may then be employed to photograph the RFID tag (e.g., the RFID tag 106) and machine identifying information (e.g., as provided on a nameplate) of the machine 104. The machine identifying information and/or the tag ID may then be extracted from the captured image and associated together in the database 112. In other cases, the photograph may be time stamped, e.g., as part of a route of several machines 104 with RFID tags 106, 108 considered in a particular order. With the order of the consideration of the machines 104 known, the timestamp may be used to later establish a chronology, from which the machine 104 and/or location association may be determined. Similarly, the mobile data collector 102 may capture an audio recording, e.g., of a user's voice speaking the machine/location identifying information and the tag ID. In each case, the mobile data collector 102 may be used to read the tag ID from the RFID tag, rather than or in addition using visual or audio cues for the tag ID. Accordingly, the tag IDs may be associated with the machines 104 and/or locations thereon on an ad hoc basis.

With the association between tag ID and the machine 104 and/or location thereon established, the method 300 may proceed to the supplier associating the tag IDs with the appropriate machine identifying data in the database 112, as at 318. As with the method 200, the method 300 may then proceed to the supplier determining the operating envelope, as at 320. Further, the user may then collect the operating data, including appropriate measurement(s) of operating conditions, as at 322. The operating data collected may then be submitted back to the supplier (i.e., to the host computing device 110), as at 324, in association with the appropriate tag ID, where the data collected may be analyzed, as at 326. The results of the analyses may then be transmitted at 328 and received at 330, e.g., using a graphical user interface, or any other type of interface, telephone, written communication, etc.

Figure 4:
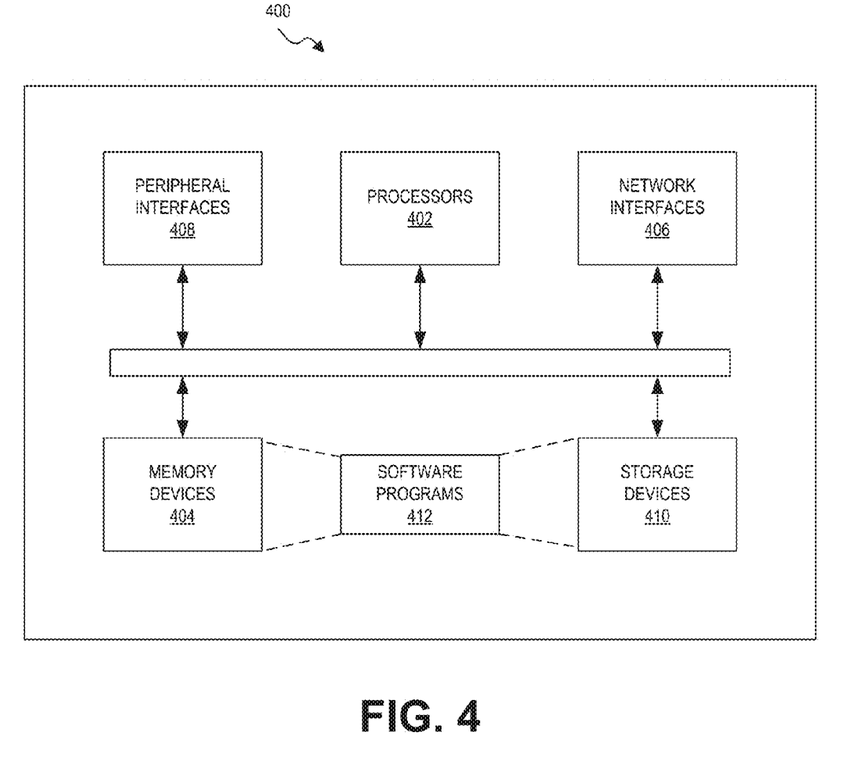
FIG. 4 illustrates a schematic of a processing system, according to an embodiment.

FIG. 4 illustrates a schematic view of a computing or processor system 400, according to an embodiment. The processor system 400 may be embodied by hardware and/or software included in the mobile data collector 102, the host computing device 110, the user computing device 120, and/or the mobile computing device 116, where included, and thus may operate to implement one or more aspects of the method(s) 100 and/or 200. Further, it will be appreciated that in various embodiments, any of the aforementioned elements of the system 100 may include multiple processor systems 400. The processor system 400 may include one or more processors 402 of varying core configurations (including multiple cores) and clock frequencies. The one or more processors 402 may be operable to execute instructions, apply logic, etc. It may be appreciated that these functions may be provided by multiple processors or multiple cores on a single chip operating in parallel and/or communicably linked together.

The processor system 400 may also include a memory system, which may be or include one or more memory devices and/or computer-readable media 404 of varying physical dimensions, accessibility, storage capacities, etc. such as flash drives, hard drives, disks, random access memory, etc., for storing data, such as images, files, and program instructions for execution by the processor 402. In an embodiment, the computer-readable media 404 may store instructions that, when executed by the processor 402, are configured to cause the processor system 400 to perform operations. For example, execution of such instructions may cause the processor system 400 to implement one or more portions and/or embodiments of the method(s) 200, 300 described above.

The processor system 400 may also include one or more network interfaces 406. The network interfaces 406 may include any hardware, applications, and/or other software. Accordingly, the network interfaces 406 may include Ethernet adapters, wireless transceivers, PCI interfaces, and/or serial network components, for communicating over wired or wireless media using protocols, such as Ethernet, wireless Ethernet, etc.

The processor system 400 may further include one or more peripheral interfaces 408, for communication with the display(s), the input devices, etc. The peripheral interface 408 may also communicate with any projectors, keyboards, mice, touchpads, sensors, other types of input and/or output peripherals, and/or the like. In some implementations, the components of processor system 400 need not be enclosed within a single enclosure or even located in close proximity to one another, but in other implementations, the components and/or others may be provided in a single enclosure.

The memory device 404 may be physically or logically arranged or configured to store data on one or more storage devices 410. The storage device 410 may include one or more file systems or databases, such as the database 112 in any suitable format. The storage device 410 may also include one or more software programs 412, which may contain interpretable or executable instructions for performing one or more of the disclosed processes. When requested by the processor 402, one or more of the software programs 412, or a portion thereof, may be loaded from the storage devices 410 to the memory devices 404 for execution by the processor 402.

Those skilled in the art will appreciate that the above-described componentry is merely one example of a hardware configuration, as the processor system 400 may include any type of hardware components, including any necessary accompanying firmware or software, for performing the disclosed implementations. The processor system 400 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 400 may be used to execute programs according to instructions received from another program or from another processor system altogether. Similarly, commands may be received, executed, and their output returned entirely within the processing and/or memory of the processor system 400. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

Moreover, in the foregoing description, locating a first feature over or on a second feature may include embodiments in which the first and second features are formed in direct contact, and may also include embodiments in which additional features may be formed interposing the first and second features, such that the first and second features may not be in direct contact. Finally, the various embodiments presented above may be combined in any combination of ways, i.e., any element from one embodiment may be used in any other embodiment, without departing from the scope of the disclosure.

What is claimed is:
1. A method for managing data, comprising:
  associating, using a processor, a plurality of machines with a plurality of tag IDs, wherein each of the tag IDs is associated with a radio frequency identification

(RFID) tag, and wherein a first one of the plurality of machines is associated with a first tag ID of the plurality of tag IDs;

determining an operating envelope for the first one of the plurality of machines;

storing the operating envelope in association with the first tag ID;

receiving data identifying the plurality of machines and associating the plurality of machines with the plurality of RFID tags, wherein:
the data identifying the plurality of machines comprises one or more timestamps; and
the plurality of machines are arranged in a preselected route;

measuring operating data representing an operating condition of the first one of the plurality of machines using a sensor, a probe, or a combination thereof of a mobile data collector;

transmitting the operating data and identification data associated with the first tag ID from the mobile data collector to a host computing device over a network;

analyzing the operating data of the first one of the plurality of machines using the host computing device, wherein the analyzing of the operating data comprises determining whether the operating data indicates that the first one of the plurality of machines is operating within the operating envelope;

during the analyzing, determining that the operating data indicates that the first one of the plurality of machines is operating outside of the operating envelope;

generating a result of the analysis using the host computing device;

transmitting the result to the mobile data collector over the network for review by a user; and performing a corrective action on the first one of the plurality of machines resulting from the analyzing and the transmitting of the result to the mobile data collector.

2. The method of claim 1, further comprising:
receiving machine identifying data from the user indicating the first one of the plurality of machines,
wherein associating comprises storing the machine identifying data in association with the first tag ID.

3. The method of claim 2, wherein the machine identifying data comprises a physical location of the first one of the plurality of machines where the first tag is located and where the operating data is collected.

4. The method of claim 2, wherein the machine identifying data comprises non-text data.

5. The method of claim 4, wherein the non-text data comprises image data, audio data, or both, and wherein the non-text data indicates the first one of the plurality of machines and the first tag ID.

6. The method of claim 1, further comprising providing the RFID tags to the user prior to receiving data identifying the plurality of machines.

7. A method of managing data, comprising:
determining an operating envelope for a machine from a plurality of machines;
receiving data identifying the machine from the plurality of machines and associating the machine with a radio frequency identification (RFID) tag, wherein the data identifying the machine comprises one or more timestamps, and wherein the machine is arranged in a preselected route;
storing the operating envelope in association with the RFID tag;
attaching the RFID tag on or near to the machine at or in proximity to a location;
causing machine data of the machine and the location for the RFID tag on the machine to be stored in a database in association with a tag ID of the RFID tag;
positioning a mobile data collector comprising a sensor, a probe, or a combination thereof, at or proximal to the location while the machine is operating;
reading the tag ID using the mobile data collector;
collecting operating data of the machine while the machine is operating using the sensor, the probe, or the combination thereof of the mobile data collector;
transmitting the operating data in association with the tag ID from the mobile data collector to a host computing device over a network;
analyzing the operating data using the host computing device, wherein the analyzing of the operating data comprises determining whether the operating data indicates that the machine is operating within the operating envelope;
during the analyzing, determining that the operating data indicates that the machine is operating outside of the operating envelope;
producing a result from the analyzing of the operating data;
transmitting the result to the mobile data collector over the network for review by a users; and
performing a corrective action on the machine resulting from the analyzing and the transmitting of the result to the mobile data collector.

8. The method of claim 7, wherein causing the machine data and the location to be stored in the database precedes attaching the RFID tag to the machine.

9. The method of claim 7, wherein causing the machine data and the location to be stored occurs subsequent to attaching the RFID tag to the machine, and wherein causing the machine data and the location to be stored comprises transmitting the machine data and the location, and the tag ID in association therewith, to the host computing device.

10. The method of claim 9, wherein transmitting the machine data comprises transmitting image data, audio data, or both indicating the tag ID and the machine data.

11. The method of claim 7, further comprising:
capturing an image, audio recording, or both identifying the machine and the tag ID; and
extracting the machine data and tag ID from the image, audio recording, or both, wherein causing the machine data and the location of the RFID tag on the machine to be stored in the database comprises transmitting the extracted machine data and the extracted tag ID to the host computing device.

12. A system for managing data, comprising:
a plurality of radio frequency identification (RFID) tags attached to a plurality of machines, wherein each of the plurality of RFID tags stores a tag ID, and the plurality of machines are arranged in a preselected route;
a mobile data collector configured to take a timestamp and a measurement of one or more operating conditions of the plurality of machines and to read the tag ID from a proximal one of the plurality of RFID tags; and
a computing device comprising a processor and a memory storing a database, the database associating the tag ID of each of the plurality of RFID tags with the one of the plurality of machines to which it is attached, wherein the computing device is configured to:
receive the measurement and the tag ID from the mobile data collector;

analyze the one or more operating conditions, including determining whether the operating data indicates that the machine associated with the ID tag is operating within an operating envelope of the machine;

generate a result of the analysis of the one or more operating conditions;

transmit the result to the mobile data collector; and initiating an alarm responsive to the operating data indicating that the machine associated with the ID tag is operating outside of the operating envelope.

13. The system of claim 12, wherein the computing device is configured to provide the result of the analysis to a user of the mobile data collector.

14. The system of claim 12, wherein the mobile data collector comprises an image capture device, an audio capture device, or both, and wherein the mobile data collector is configured to capture an image, an audio recording, or both indicating an identity of one of the plurality of machines and the tag ID of one or the plurality of RFID tags.

15. The system of claim 14, wherein the mobile data collector is configured to extract the identity of the one of the plurality of machines and the tag ID from the image, audio recording, or both and transmit the identity and the tag ID to the computing device.

16. The system of claim 14, wherein the mobile data collector is configured to transmit the image, audio recording, or both to the computing device for extraction.

17. The system of claim 12, wherein the plurality of RFID tags are positioned at locations on the plurality of machines, wherein the tag ID of each of the RFID tags is associated with the location at which the respective RFID tag is attached, and wherein at least one of the plurality of machines has two or more RFID tags attached thereto at different locations thereof.

18. The system of claim 17, wherein the mobile data collector is configured to capture the tag ID of one of the plurality of RFID tags when the mobile data collector is positioned in proximity to a location at which the one of the plurality of RFID tags is attached, and wherein the tag ID is stored in association with the location.

19. The method of claim 1, further comprising establishing a chronology using the timestamp, wherein the chronology identifies either one machine of the plurality of machines in the preselected route or the location of the one machine of the plurality of machines in the preselected route, or both.

* * * * *